(12) United States Patent
Kim (10) Patent No.: US 9,172,898 B2
(45) Date of Patent: *Oct. 27, 2015

(54) VIDEO DISPLAY APPARATUS AND METHOD OF SETTING USER VIEWING CONDITIONS

(71) Applicant: LG ELECTRONICS INC., Seoul (KR)

(72) Inventor: In Hee Kim, Pyeongtaek-si (KR)

(73) Assignee: LG ELECTRONICS INC., Seoul (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/242,628

(22) Filed: Apr. 1, 2014

(65) Prior Publication Data

US 2014/0211092 A1 Jul. 31, 2014

Related U.S. Application Data

(63) Continuation of application No. 13/061,431, filed as application No. PCT/KR2009/004844 on Aug. 28, 2009, now Pat. No. 8,737,919.

(30) Foreign Application Priority Data

Aug. 28, 2008 (KR) .......................... 10-2008-0084340

(51) Int. Cl.
*H04B 7/00* (2006.01)
*H04N 5/445* (2011.01)
(Continued)

(52) U.S. Cl.
CPC .............. *H04N 5/445* (2013.01); *G06F 3/0484* (2013.01); *H04N 5/44543* (2013.01); *H04N 21/4182* (2013.01); *H04N 21/42204* (2013.01); *H04N 21/436* (2013.01); *H04N 21/4532* (2013.01); *H04N 21/4751* (2013.01)

(58) Field of Classification Search
CPC ................... H04N 21/4182; H04N 21/42204; H04N 21/4532
USPC ........... 455/41.1, 41.2, 41.3, 556.1, 557, 566; 710/8; 725/117, 132; 348/178
See application file for complete search history.

(56) References Cited

U.S. PATENT DOCUMENTS 7,162,733 B2 * 1/2007 Kamieniecki ................. 725/133
7,734,835 B2 6/2010 Jo et al.
(Continued)

FOREIGN PATENT DOCUMENTS

CN 1783944 A 6/2006
CN 1848871 A 10/2006
(Continued)

*Primary Examiner* — Ping Hsieh
(74) *Attorney, Agent, or Firm* — Birch, Stewart, Kolasch & Birch, LLP (57) ABSTRACT

A method of setting user viewing conditions of a video display apparatus including determining whether a detected terminal is registered by receiving address information of the detected terminal; measuring a received signal strength indication (RSSI) of the detected terminal, if the detected terminal is registered, comparing the RSSI of the detected terminal with preset reference RSSI; comparing a priority order of the detected terminal user profile with a priority order of a preset user profile, if a value of the measured RSSI is larger than a value of the reference RSSI; loading the detected user profile of the terminal, if the priority order of the detected terminal user profile is higher than the priority order of a preset user profile; and setting user viewing conditions based on the loaded user profile.

20 Claims, 6 Drawing Sheets

(51) Int. Cl.
*H04N 21/418* (2011.01)
*H04N 21/422* (2011.01)
*H04N 21/436* (2011.01)
*H04N 21/45* (2011.01)
*H04N 21/475* (2011.01)
*G06F 3/0484* (2013.01)

(56) References Cited

U.S. PATENT DOCUMENTS

| | | |
|---|---|---|
| 7,853,207 B2 | 12/2010 | Harada et al. |
| 8,150,323 B2 | 4/2012 | Kim |
| 2004/0117852 A1* | 6/2004 | Karaoguz et al. ............. 725/134 |
| 2005/0136901 A1* | 6/2005 | Jung et al. ..................... 455/415 |
| 2006/0080415 A1* | 4/2006 | Tu ................................ 709/220 |
| 2006/0117115 A1* | 6/2006 | Jo et al. ............................. 710/8 |
| 2006/0229014 A1* | 10/2006 | Harada et al. ................ 455/41.2 |
| 2007/0093207 A1 | 4/2007 | Kim |
| 2007/0202808 A1 | 8/2007 | Kim |
| 2009/0133090 A1* | 5/2009 | Busse ............................ 725/132 |
| 2011/0237188 A1* | 9/2011 | Sen ............................... 455/41.2 |

FOREIGN PATENT DOCUMENTS

| | | |
|---|---|---|
| CN | 101123455 A | 2/2008 |
| CN | 101202889 A | 6/2008 |
| EP | 1 587 290 A2 | 10/2005 |
| GB | 2 455 055 A | 6/2009 |
| JP | 2005-117185 A | 4/2005 |
| KR | 10-2006-0108207 A | 10/2006 |
| KR | 10-0741325 B1 | 7/2007 |
| WO | WO 2009/067670 A1 | 5/2009 |

\* cited by examiner

VIDEO DISPLAY APPARATUS AND METHOD OF SETTING USER VIEWING CONDITIONS

CROSS-REFERENCE TO RELATED APPLICATIONS

This application is a Continuation of copending application Ser. No. 13/061,431 filed on Apr. 20, 2011, which is a National Phase of International Application No. PCT/KR2009/004844 filed Aug. 28, 2009, which claims priority to Application No. 10-2008-0084340 filed in the Republic of Korea on Aug. 28, 2008. The entire contents of all of the above applications is hereby incorporated by reference.

BACKGROUND OF THE INVENTION

1. Field of the Invention

The present invention relates to a video display apparatus and a method of setting user viewing conditions, more specifically, to a video display apparatus that is able to set viewing conditions for users via communication with a peripheral bluetooth device by using Bluetooth technology.

2. Discussion of the Related Art

Generally, if a user selects a viewing condition menu, a viewing condition is set based on a setting value predetermined in a conventional video display apparatus. That is, Television viewing conditions may be supplied to the user based on predetermined menu settings including predetermined video images and audio sounds. Such a video display apparatus typically has a function of adjusting a video mode and audio mode. As a result, the user sets video mode adjustment values such as desired contrast, brightness, color intensity and sharpness and audio mode adjustment values such as bais, treble, balance and the like.

SUMMARY OF THE INVENTION

Figure 1:
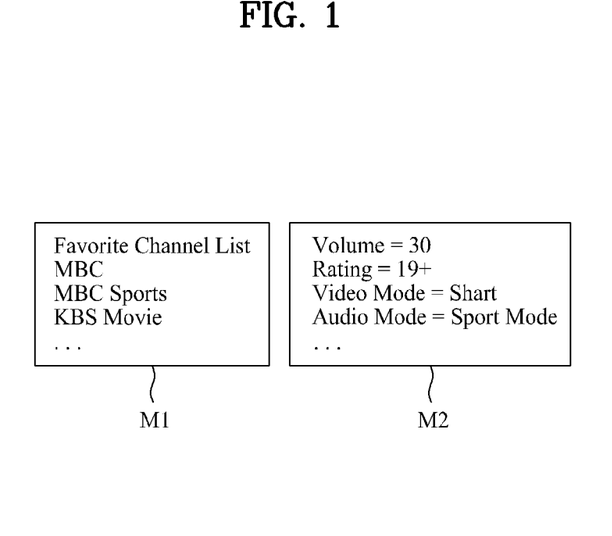
FIG. 1 is a diagram illustrating viewing conditions of a conventional video display apparatus.

FIG. 1 is a diagram illustrating viewing condition setting of a conventional video display apparatus.

First of all, a favorite channel list (M1) displays a plurality of channels and broadcasting program titles. According to the conventional video display apparatus, when registering favorite channels, users are not categorized. In a user viewing setting (M2) of the conventional video display apparatus, only one setting value, for example, volume (30), viewer rating (more than 19 years), video mode (clear mode), audio mode (sport mode) and the like is preset and stored. This may cause a problem that various user requirements cannot be satisfied.

Moreover, displaying means out of video display apparatuses such as Televisions have various menus operable by the user. Especially, selection for favorite channels, volumes, viewer ratings and the like may be different according to the user preference and age. The user viewing condition setting of the conventional video display apparatus that provides users with only one stetting fails to reflect such the requirements. Even in case there might various settings according to users, it will be inconvenient to change such the various settings manually every time when the user views the television.

Recently, apparatuses having Bluetooth installed therein have been consumed a lot. Especially, Bluetooth is adapted to mobile phones as standard feature. Models of televisions Bluetooth that supports Bluetooth headset have been released. The present invention is invented to improve user convenience through communication between Bluetooth device and televisions.

To solve the problems, an object of the present invention is to provide a video display apparatus and a method of setting user viewing conditions thereof, which is able to register a Bluetooth device and to set user viewing conditions of the video display apparatus automatically.

Another object of the present invention is to provide a video display apparatus and a method of setting user viewing conditions, which is able to give the priority order to a plurality of detected bluetooth devices, if they are detected by the video display apparatus, and to set user viewing conditions according to the priority order of the Bluetooth devices.

A further object of the present invention is to provide a video display apparatus and a method of setting user viewing conditions, which is able to load user profile of a Bluetooth device having the lowest rating and to set user viewing conditions, if a plurality of registered Bluetooth devices having different ratings are detected by the video display apparatus.

To achieve these objects and other advantages and in accordance with the purpose of the invention, as embodied and broadly described herein, a video display apparatus includes a Bluetooth module detecting a peripheral Bluetooth terminal via inquiry scan/response and acquiring address information of the detected Bluetooth terminal; a control unit loading user profile of the detected Bluetooth terminal and setting user viewing conditions based on the loaded user profile; a profile database storing the user profile of the detected Bluetooth terminal and user profile setting menu managing the user profile; a tuner receiving a broadcasting program based on the set user viewing conditions; a video/audio processor processing the received broadcasting program into video and audio signals based on the set user viewing conditions; and a display unit displaying the processes video signal and outputting the user profile setting menu as OSD message.

The Bluetooth module periodically may inquiry-scan a peripheral Bluetooth terminal.

The control unit may determine whether the detected Bluetooth terminal is registered based on the acquired address information and the control unit may generate user profile of the detected terminal, that includes the address information and user viewing condition setting values, by using the user profile setting menu if the terminal is not registered based on the result of the determination.

The control unit may measure RSSI of the detected Bluetooth terminal and the control unit may compare the measured RSSI with a reference RSSI to determine a connection state of the detected Bluetooth terminal.

The user profile of the user profile database may include Bluetooth terminal information and user viewing condition setting values of the Bluetooth terminal and priority order information.

The Bluetooth terminal information may include a kind, address and reference RSSI of the Bluetooth terminal.

The user viewing condition setting values may include a favorite channel list, volume, rating, video mode, audio mode, password, automatic power on/off, reservation viewing and record information.

The user profile setting menu stored in the user profile database may include registration, calling, and deletion and priority order changes of the user profile.

The user profile setting menu may add a password function to limit access to the user profile.

The video display apparatus may further include a HCI communication control unit controlling the Bluetooth module to perform the inquiry scan by using command packet and outputting even packet according to the response to the control unit.

In another aspect of the present invention, a method of setting user viewing conditions of a video display apparatus includes steps of: detecting a peripheral bluetooth terminal via inquiry scan/response; determining whether the detected bluetooth terminal is registered by receiving address information of the detected bluetooth terminal; displaying a setting menu of user profile to register the bluetooth terminal, if it is determined that the bluetooth terminal is not registered; and generating user profile of the bluetooth terminal comprising address information of the bluetooth terminal and setting values of user viewing conditions by using the displayed the setting menu of the user profile.

The generated user profile may further include information of priority order of user profiles.

The method may further include measuring and comparing RSSI of the detected bluetooth terminal with preset reference RSSI.

If a value of the measured RSSI is larger than a value of the reference RSSI based on the result of the comparison, the bluetooth terminal may be registered.

The method may further include outputting a message of disconnecting the bluetooth terminal, if a value of the measured RSSI is smaller than a value of the reference RSSI based on the result of the comparison.

The user profile setting menu may include menu lists of registering, calling, deleting user profile and changing the priority order of the user profile.

The user profile setting menu may add a password function to limit access to the user profile.

The setting values of the user viewing conditions may include a favorite channel list, volume, rating, video mode, audio mode, password, automatic power on/off, reservation viewing and record information.

In a further aspect of the present invention, a method of setting user viewing conditions of a video display apparatus includes steps of: detecting a peripheral bluetooth terminal via inquiry scan/response; determining whether the detected bluetooth terminal is registered; comparing the priority order of the detected bluetooth terminal user profile with the priority order of a preset user profile, if the bluetooth terminal is registered based on the result of the determination; loading the user profile of the bluetooth terminal, if the priority order of the detected terminal user profile is higher based on the result of the comparison; and setting user viewing conditions based on the loaded user profile.

A message of disconnecting the detected bluetooth terminal may be outputted, if the priority order of the detected terminal user profile is lower based on the result of the comparison.

The method may further include measuring and comparing RSSI of the detected bluetooth terminal with preset reference RSSI.

If a value of the measured RSSI is larger than a value of the reference RSSI based on the result of the comparison, the priority order of the bluetooth terminal may be compared with the priority order of preset use profile.

A message of disconnecting the bluetooth terminal may be outputted, if a value of the measured RSSI is smaller than a value of the reference RSSI based on the result of the comparison.

The setting values of the user viewing conditions may include a favorite channel list, volume, rating, video mode, audio mode, password, automatic power on/off, reservation viewing and record information.

The set user viewing conditions may be maintained until at one of power-off, disconnection of Bluetooth terminal and load of the other user profiles may be performed.

If a plurality of other Bluetooth terminals are connected having different ratings are connected in the step of detecting the peripheral Bluetooth terminal, user profile of the Bluetooth terminal having the lowest rating may be loaded to set user viewing conditions.

If the Bluetooth terminal set as the user viewing conditions is re-detected for a predetermined time period, it may be asked as OSD message whether to load standard user profile.

Advantageous Effects

The present invention has following advantageous effects.

The video display apparatus according to the present invention automatically recognizes the user by using bluetooth devices, especially, mobile terminals such as mobile phones. As a result, the viewing conditions in consideration of ordinary viewing patterns or tastes of the user may be provided and a single television may be personalized by a plurality of users.

BRIEF DESCRIPTION OF THE DRAWINGS

The accompanying drawings, which are included to provide further understanding of the disclosure and are incorporated in and constitute a part of this application, illustrate embodiments of the disclosure and together with the description serve to explain the principle of the disclosure.

In the drawings:

FIG. 4 including

DETAILED DESCRIPTION OF THE INVENTION

Reference will now be made in detail to the specific embodiments of the present invention, examples of which are illustrated in the accompanying drawings. Wherever possible, the same reference numbers will be used throughout the drawings to refer to the same or like parts.

Figure 2:
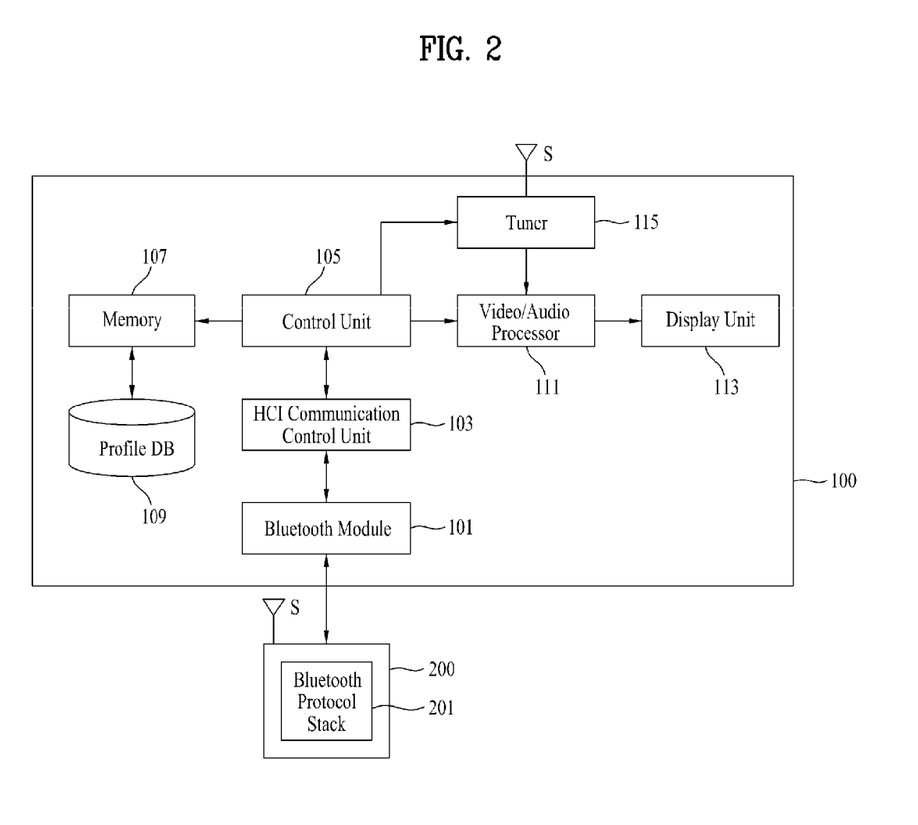
FIG. 2 is an inner block view illustrating a video display apparatus 100 in communication with a peripheral Bluetooth device 200 according to an exemplary embodiment of the present invention.

FIG. 2 is an inner block view illustrating a video display apparatus 100 in communication with a peripheral Bluetooth device 200 according to an exemplary embodiment of the present invention.

The video display apparatus 100 includes a Bluetooth module 101, HCI communication controller 103, control unit 105, memory 107, a user profile DB 109, video/audio processor 111, display unit 113 and a tuner 115.

The Bluetooth module 101 performs inquiry for find out which peripheral devices there are and what is their communication address. The Bluetooth module 101 selects and sets an address of a Bluetooth device desired to communicate based on the collected addresses during the inquiry and it exchanges data with the Bluetooth device.

HCI communication controller 103 having defined interface, namely, host control interface (HCI) transmits and receives HCI packet to and from Bus firm ware. The HIC packet is categorized into command, event and data packets. The HCI communication controller 103 commands the Bluetooth module 101 to start the inquiry by using the command packet. In addition, the HCI communication controller 103 outputs an event packet to the control unit 105 based on the result of the inquiry performed by the Bluetooth module 101.

The control unit 105 acquires information of relative Bluetooth device by using the event packet transmitted from the HCI communication controller 103 and the address of the Bluetooth module 101. The control unit 105 identifies whether the Bluetooth terminal is registered to the user profile based on the acquired information of the Bluetooth device. Then, the control unit 105 loads user profile of the corresponding Bluetooth device based on the acquired information of the Bluetooth device. The control unit 105 sets user viewing conditions or generates new user profile by using the information of the connected Bluetooth device to register a setting value of user viewing condition.

In addition, the control unit 105 measures strength of a signal (Received Signal Strength Indication, RSSI) received by the detected Bluetooth device and it compares the measured signal strength with a preset reference RSSI to determine a connection state of the detected Bluetooth device.

The memory 107 stores programs for connection with Bluetooth devices according to the present invention therein.

The user profile database 109 stores setting values of viewing conditions according to Bluetooth device user types and user profile such as the information of the Bluetooth device therein. Here, the Bluetooth device information includes the name, address, signal strength of the Bluetooth terminal. The profile database 109 supplies graphical user interface, GUI that manages the user profile, for example, inputting a setting value of the user viewing condition corresponding to the information of the relative Bluetooth device to the user profile, determining the order of priority among the user profiles and the like. This may be referenced to as user profile setting menu. If the user profile setting menu is supplied in OSD way, the user may register, call and delete the user profile and also he may change the order of priority of the user profile and limit access to the setting menu of the user profile by setting password.

The control unit 105 measures RSSI of the peripheral Bluetooth device transmitted to the Bluetooth module 101. If a value of the received RSST is larger than a value of the referenced RSSI, the control unit 105 determines that the Bluetooth device is connected and that the user of the corresponding Bluetooth device is in the viewing conditions of the television that is the video display apparatus. When registering the user profile, the control unit 105 outputs OSD message via the display unit 113 to inform that the user of the corresponding Bluetooth device would be remote as far as viewing fully before registering the Bluetooth device. Generally, the RSSI is in reverse proportion to the distance with the Bluetooth device and it can be used to measure a relative distance with respect to devices.

The control unit 105 loads user profile corresponding to the peripheral Bluetooth device 100 detected via the Bluetooth module 101 of the video display apparatus 100 and it sets user viewing conditions.

The tuner 115 receives corresponding broadcasting programs to reflect favorite channels, viewer rating, reservation viewing and recording information according to the preset user viewing conditions.

The video/audio processor 111 processes and outputs video and audio modes of the broadcasting program received according to the preset user viewing conditions.

The display unit 113 displays images processed by the video/audio processor 111 and it outputs various OSD messages according to the present invention.

The Bluetooth device 200 includes a Bluetooth protocol stack 201 having a unique identification number and it is connected to the broadcasting receiver 100 having the Bluetooth module 101 installed therein to communicate with. Here, the Bluetooth device 200 communicate with the broadcasting receiver 100 by using serial profile prescribed in standard Bluetooth standard Ver. 1.2. The Bluetooth device 200 responds its address under allowance of operating conditions for lookup process of the other Bluetooth devices, namely, inquiry scan/response.

Figure 3A:
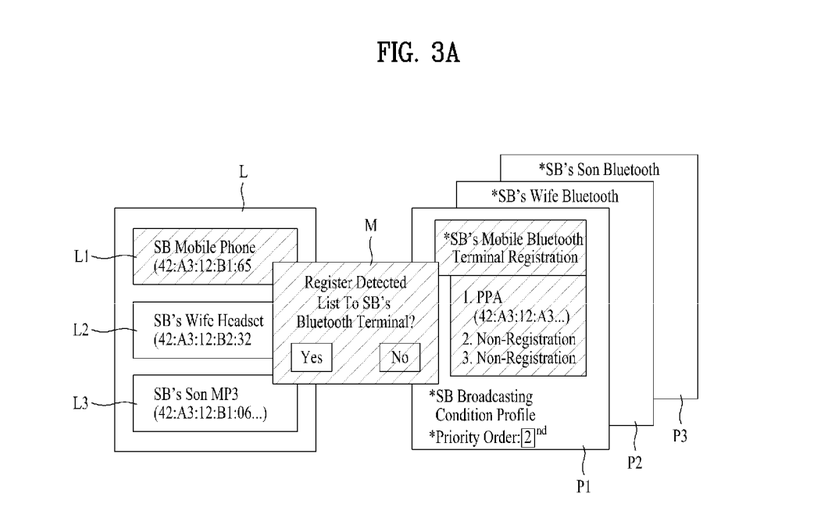
FIG. 3a is a diagram illustrating a user profile setting menu for Bluetooth user registration.

FIG. 3a is a diagram illustrating user profile setting menu for Bluetooth user registration according to the present invention.

The Bluetooth module 101 of the video display apparatus receives Bluetooth device information (L1, L2 and L3) including address information via inquiry scan/response with peripheral Bluetooth devices. In addition, the Bluetooth module 101 generates user profiles (P1, P2 and P3) according to Bluetooth user type based on the Bluetooth device information detected in the video display apparatus.

Selected Bluetooth device address information (42:A3:12:B1:65: . . . ) of the detected Bluetooth device information is asked whether to be registered to corresponding user profile (P1). The user profile (P1) includes a bluetooth terminal list of a registered user, a setting value of user viewing conditions and information of the user priority order.

Figure 3B:
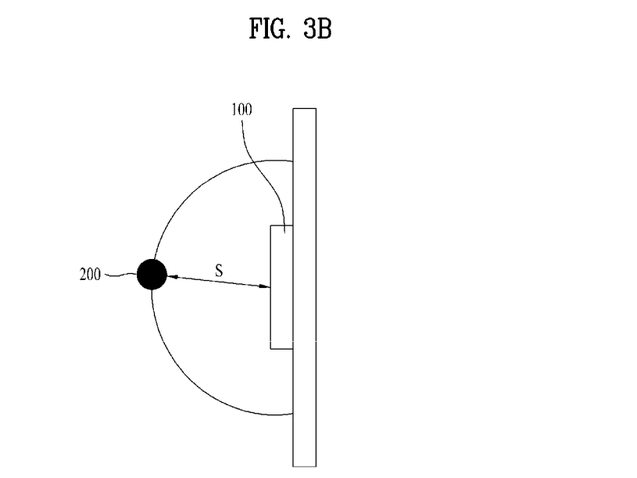
FIG. 3b is a diagram illustrating a distance according to RSSI measurement of the peripheral Bluetooth device according to the video display apparatus of the present invention.

FIG. 3b is a diagram illustrating a distance according to RSSI measurement of the peripheral bluetooth device according to the present invention.

Bluetooth uses 2.4 GHz ISM (Industrial Scientific Medical band radio frequency with 1 Mbps of transfer speed to enable wireless data communication against obstacles. Bluetooth is Ad hoc network configured of connection among more than two piconets. Here, the piconet is a set of devices sharing identical channels to exchange information. The video display apparatus 100 may manage whether the bluetooth device 200 is positioned within a predetermined distance, whether it maintains connection or finishes the connection, the bluetooth device is linked to the piconet.

The video display apparatus 100 according to the present invention detects peripheral bluetooth devices 200 via inquiry scan/response by using the bluetooth module and it measures RSSI of the peripheral bluetooth devices 200. Then, the video display apparatus 100 compares the measured RSSI with a preset reference RSSI and it outputs the connection state of the detected bluetooth devices via the display unit as OSD message. If the RSSI transmitted from the detected bluetooth device 200 is larger than the preset reference value, it is determined that the detected bluetooth device is connected to the video display apparatus 100 and that the user is within a predetermined distance (S) for viewing TV. As a result, if the registered bluetooth device 200 is detected and connected to the video display apparatus 100, the user profile corresponding to the bluetooth device may be loaded automatically or based on user selection. At this time, it is preferable that the predetermined bluetooth communication distance (S) is 10 m.

The video display apparatus 100 detects peripheral bluetooth devices 200 periodically by using the bluetooth module and the registered terminal is automatically linked to the piconet.

Once the user profile corresponding to the detected bluetooth device is loaded, the video display apparatus 100 maintains the user viewing conditions until the power off, disconnection of the registered terminal or until other user profile of detected bluetooth terminal with high priority is loaded.

Here, the disconnection means that it is determined that the user of the bluetooth device 200 connected to the video display apparatus 100 is absent for a predetermined time period, if a value of the received RSSI is smaller than a value of RSSI stored for a predetermined time period although the bluetooth device 200 exists in the bluetooth piconet, or if the corresponding bluetooth device is not detected in the bluetooth piconet for a predetermined time period.

In case of the disconnection with the bluetooth device 200, the video display apparatus 100 outputs the disconnection as OSD message. If there is no re-detection of the bluetooth device for a predetermined time period, the video display apparatus 100 asks the user whether to load user profile having a higher order of priority than the former one or it outputs standard profile load as OSD message.

Figure 4A:
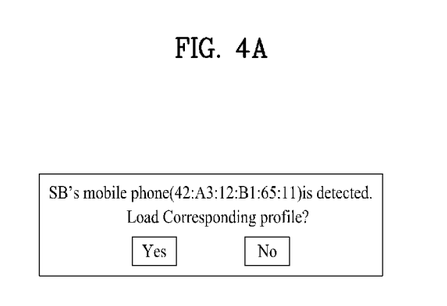
FIGS. 4a and 4b is a diagram illustrating a user profile setting menu according to another embodiment of the present invention.
Figure 4B:
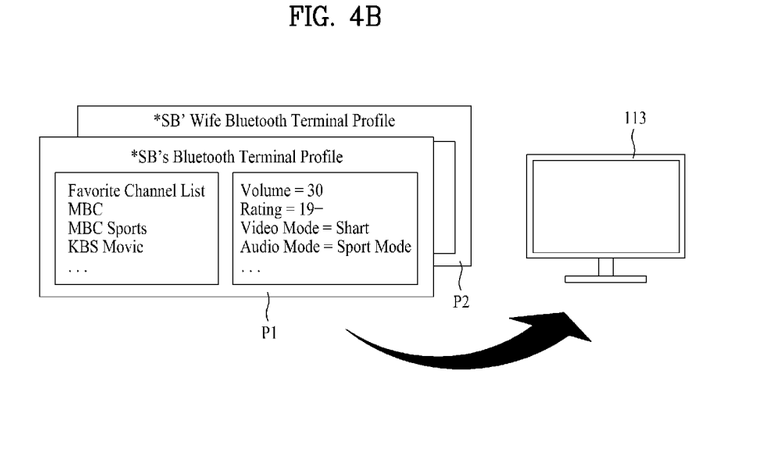

FIG. 4 including FIGS. 4a and 4b is a diagram illustrating a setting menu of the user profile according to the exemplary embodiment of the present invention.

FIG. 4a is an OSD message displayed in a display screen to ask the user whether to load user profile of the detected bluetooth device.

FIG. 4b shows the user viewing conditions of bluetooth user profile (P1, P2 and P3) displayed in the video display apparatus 100. The bluetooth user profile includes a favorite channel list according to user types, volume, rating, video mode, audio mode, password, automatic power on/off, reservation viewing and record information. Especially, the video display apparatus according to the present invention sets user viewing conditions in communication with bluetooth devices such that it can manage the rating automatically. For example, if a plurality of bluetooth terminals with different ratings is connected, the bluetooth user profile with a relatively lower rating is loaded to set the user viewing conditions. That is, if there are different ratings, a relatively lower rating is selected such that children and their parents may view a corresponding broadcasting program together.

Figure 5:
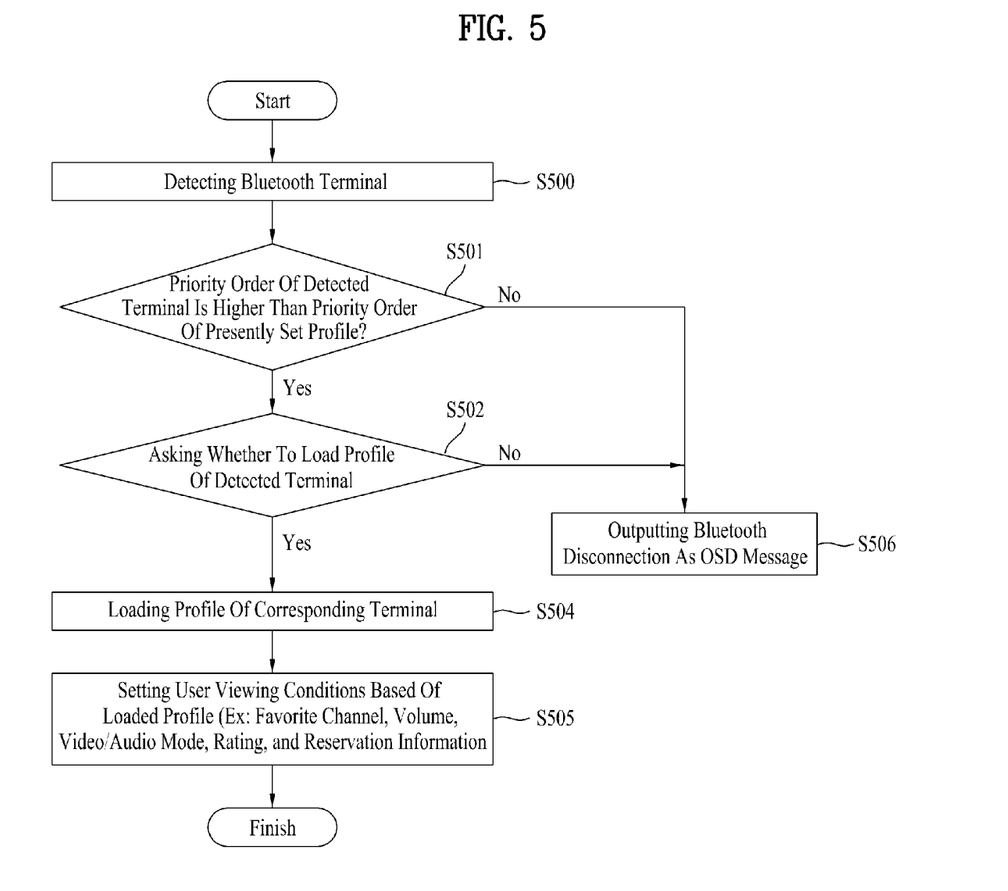
FIG. 5 is a flow chart illustrating a method of setting user viewing conditions of the video display apparatus using the Bluetooth device according to an exemplary embodiment of the present invention.

FIG. 5 is a flow chart illustrating a method of setting user viewing conditions of the video display apparatus in communication with bluetooth devices according to an exemplary embodiment of the present invention.

The video display apparatus detects peripheral bluetooth devices via inquiry scan/response by using the bluetooth module installed therein (S500).

The priority order of the profile preset in the video display apparatus at the present is compared and determined with the user profile corresponding to the detected bluetooth terminal (S501).

If the priority order of the detected bluetooth terminal is higher than that of the preset profile, it is asked via the display unit whether the user profile of the detected bluetooth terminal is loaded (S502).

If the user selects the load of the corresponding profile, the user profile of the detected bluetooth terminal is loaded (S504).

The user viewing conditions preset in the loaded user profile is set (S505). Here, the user favorite channels, volume value, video/audio mode, rating and reservation information of the detected bluetooth terminal user may be set as user viewing conditions.

If the priority order of the profile of the detected bluetooth terminal is lower than that of the preset profile or if the user refuses to load the corresponding profile, the detected bluetooth terminal is disconnected and the disconnection is outputted as OSD message via the display unit (S506).

Figure 6:
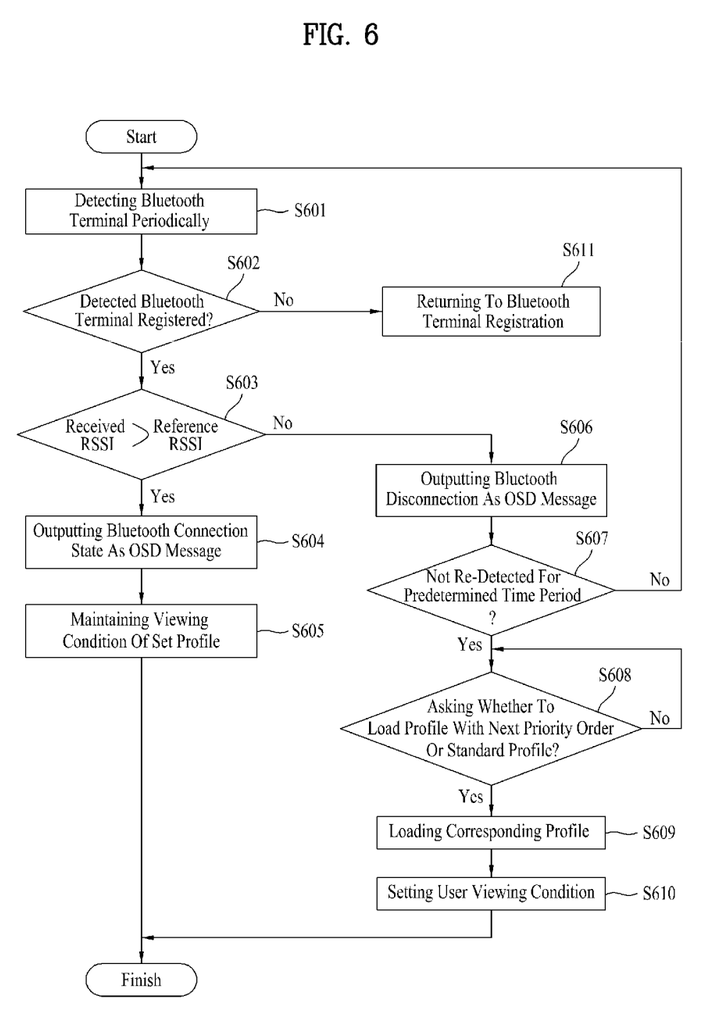
FIG. 6 is a method of setting user viewing conditions of the video display apparatus using the Bluetooth device according to another embodiment of the present invention.

FIG. 6 is a flow chart illustrating a method of setting user viewing conditions of the video display apparatus in communication with a bluetooth device according to another embodiment of the present invention.

The video display apparatus periodically detects a peripheral bluetooth device via inquiry scan/response by using the bluetooth module (S601).

It is determined whether the detected bluetooth terminal is registered (S602).

If the detected bluetooth terminal is not preset and registered, a registering step registering the corresponding bluetooth terminal to the bluetooth user profile starts (S611).

If the detected bluetooth terminal is registered one, RSSI of the bluetooth terminal is measured and compared with a preset reference RSSI (S603), If the value of the received RSSI is larger than the value of the reference RSSI, it is outputted as OSD message that the bluetooth connection is maintained (S604).

The user viewing conditions of the user profile corresponding to the detected bluetooth terminal is maintained (S605).

If the value of the received RSSI is smaller than the value of the reference RSSI, the preset bluetooth terminal is disconnected and the disconnection is outputted as OSD message (S606).

After the disconnection with the detected bluetooth terminal is complete, it is determined whether a bluetooth terminal is re-detected for a predetermined time period (S608).

If it is determined to perform the re-detection, the step (S601) is performed.

If the re-detection of the bluetooth terminal is not performed for a predetermined time period, the user is asked whether to load user profile having the next higher priority order than the user profile of the preset bluetooth terminal. Or if there is no bluetooth terminal, the user is asked to load standard profile (S608).

The corresponding profile required by the user is loaded (S609). The user viewing conditions of the loaded profile is set as setting value (S610). Here, operations of the video display apparatus performed during the viewing period is renewed and stored as corresponding user viewing condition value.

In the meanwhile, the terminology user in the specification of the present invention is defined in consideration of functions and it may be varied according to purpose or practices of people who pertains to the art. As a result, the definition of terminology may be performed based on the content of the description.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention has an industrial applicability.

The video display apparatus according to the present invention automatically recognizes the user by using bluetooth devices, especially, mobile terminals such as mobile phones. As a result, the viewing conditions in consideration of ordinary viewing patterns or tastes of the user may be provided and a single television may be personalized by a plurality of users.

The invention claimed is:

1. A method of setting user viewing conditions of a video display apparatus, the method comprising:
   detecting a peripheral terminal via a wireless communication;
   determining whether the detected terminal is registered by receiving address information of the detected terminal;
   measuring a received signal strength indication (RSSI) of the detected terminal, if the detected terminal is registered;
   comparing the RSSI of the detected terminal with preset reference RSSI;
   comparing a priority order of the detected terminal user profile with a priority order of a preset user profile, if a value of the measured RSSI is larger than a value of the reference RSSI;
   loading the detected user profile of the terminal, if the priority order of the detected terminal user profile is higher than the priority order of a preset user profile; and
   setting user viewing conditions based on the loaded user profile.

2. The method as claimed in claim 1, wherein a message of disconnecting the detected terminal is outputted, if the priority order of the detected terminal user profile is lower than the priority order of a preset user profile.

3. The method as claimed in claim 1, wherein a message of disconnecting the terminal is outputted, if the value of the measured RSSI is smaller than the value of the reference RSSI.

4. The method as claimed in claim 1, wherein the setting value of the user viewing conditions includes at least one of a favorite channel list, volume, viewer rating, video mode, audio mode, password, automatic power on/off, reservation viewing and record information.

5. The method as claimed in claim 1, wherein the set user viewing conditions are maintained until one of a power-off, a disconnection of the detected terminal and a load of another user profile is performed.

6. The method as claimed in claim 1, wherein if a plurality of terminals is connected, a user profile of a terminal having the lowest viewer rating is loaded to set user viewing conditions.

7. The method as claimed in claim 1, wherein if the terminal set as the user viewing conditions is disconnected for a predetermined time period, it is asked as an on-screen display (OSD) message whether to load a standard user profile.

8. The method as claimed in claim 1, wherein the user profile includes a terminal list of a registered user, the setting value of user viewing conditions and information of the user priority order.

9. The method as claimed in claim 8, wherein the terminal list includes a name, address, signal strength of the terminal.

10. The method as claimed in claim 1, wherein the peripheral terminal is detected by a Bluetooth via inquiry scan/response.

11. A video display apparatus comprising:
    a communication module detecting a peripheral terminal via a wireless communication and acquiring address information of the detected terminal;
    a control unit loading a user profile of the detected terminal and setting user viewing conditions based on the loaded user profile;
    a profile database storing the user profile of the detected terminal and a user profile setting menu managing the user profile;
    a tuner receiving a broadcasting program based on the set user viewing conditions;
    a video/audio processor processing the received broadcasting program into video and audio signals based on the set user viewing conditions; and
    a display unit displaying the processed video signal and outputting the user profile setting menu as an on-screen display (OSD) message,
    wherein the control unit is configured to determine whether the detected terminal is registered by receiving address information of the detected terminal, to measure a received signal strength indication (RSSI) of the detected terminal, if the detected terminal is registered, to compare the RSSI of the detected terminal with preset reference RSSI, and to compare a priority order of the detected terminal user profile with a priority order of a preset user profile, if a value of the measured RSSI is larger than a value of the reference RSSI.

12. The video display apparatus as claimed in claim 11, wherein the communication module periodically inquiry-scans a peripheral terminal.

13. The video display apparatus as claimed in claim 11, wherein the control unit determines whether the detected terminal is registered based on the acquired address information and the control unit generates a user profile of the detected terminal, that includes the address information and user viewing condition setting values, by using the user profile setting menu if the terminal is not registered based on the result of the determination.

14. The video display apparatus as claimed in claim 11, wherein the user profile of the user profile database includes at least one of terminal information and user viewing condition setting values of the terminal and priority order information.

15. The video display apparatus as claimed in claim 14, wherein the terminal information includes at least one of a kind, address and reference RSSI of the terminal.

16. The video display apparatus as claimed in claim 14, wherein the user viewing condition setting values includes at least one of a favorite channel list, volume, viewer rating, video mode, audio mode, password, automatic power on/off, reservation viewing and record information.

17. The video display apparatus as claimed in claim 11, wherein the user profile setting menu stored in the user profile database includes at least one of registration, calling, deletion and priority order changes of the user profile.

18. The video display apparatus as claimed in claim 11, wherein the user profile setting menu adds a password function to limit access to the user profile.

19. The video display apparatus as claimed in claim 11, further comprising:
    a host control interface (HCI) communication control unit controlling the communication module to perform the inquiry scan by using a command packet and outputting an even packet according to the response to the control unit.

20. The video display apparatus as claimed in claim 11, wherein the peripheral terminal is detected by a Bluetooth via inquiry scan/response.

* * * * *